United States Patent
Sharifi et al.

(10) Patent No.: US 10,109,270 B2
(45) Date of Patent: Oct. 23, 2018

(54) ADAPTIVE TEXT-TO-SPEECH OUTPUTS

(71) Applicant: Google LLC, Mountain View, CA (US)

(72) Inventors: Matthew Sharifi, Kilchberg (CH);
Jakob Nicolaus Foerster, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/653,872

(22) Filed: Jul. 19, 2017

(65) Prior Publication Data

US 2017/0316774 A1    Nov. 2, 2017

Related U.S. Application Data

(63) Continuation of application No. 15/477,360, filed on Apr. 3, 2017, now Pat. No. 9,886,942, which is a continuation of application No. 15/009,432, filed on Jan. 28, 2016, now Pat. No. 9,799,324.

(51) Int. Cl.
*G06F 17/27* (2006.01)
*G10L 13/04* (2013.01)
*G10L 13/08* (2013.01)

(52) U.S. Cl.
CPC .......... *G10L 13/043* (2013.01); *G06F 17/274* (2013.01); *G06F 17/2775* (2013.01); *G10L 13/08* (2013.01)

(58) Field of Classification Search
USPC ................................................ 704/257–275
See application file for complete search history.

(56) References Cited

U.S. PATENT DOCUMENTS

| | | | |
|---|---|---|---|
| 5,870,709 A | 2/1999 | Bernstein | |
| 7,096,183 B2 | 8/2006 | Junqua | |
| 8,744,855 B1 | 6/2014 | Rausch | |
| 2001/0049602 A1* | 12/2001 | Walker | G10L 13/08 704/260 |
| 2004/0117180 A1 | 6/2004 | Rajput et al. | |
| 2004/0193421 A1 | 9/2004 | Blass | |
| 2005/0015307 A1* | 1/2005 | Simpson | G06F 17/30241 705/26.61 |
| 2006/0229873 A1 | 10/2006 | Eide et al. | |
| 2007/0238076 A1 | 10/2007 | Burstein et al. | |
| 2008/0162471 A1* | 7/2008 | Bernard | G06F 17/30017 |
| 2011/0093271 A1 | 4/2011 | Bernard | |
| 2013/0080173 A1 | 3/2013 | Talwar et al. | |

(Continued)

OTHER PUBLICATIONS

Invitation to Pay Additional Fees and Where Applicable Protest Fee, with Partial Search Report, dated May 4, 2017, 8 pages.

(Continued)

*Primary Examiner* — Jesse Pullias
(74) *Attorney, Agent, or Firm* — Honigman Miller Schwartz and Cohn LLP

(57) ABSTRACT

In some implementations, a language proficiency of a user of a client device is determined by one or more computers. The one or more computers then determines a text segment for output by a text-to-speech module based on the determined language proficiency of the user. After determining the text segment for output, the one or more computers generates audio data including a synthesized utterance of the text segment. The audio data including the synthesized utterance of the text segment is then provided to the client device for output.

19 Claims, 6 Drawing Sheets

(56) References Cited

U.S. PATENT DOCUMENTS

2013/0325482 A1* 12/2013 Tzirkel-Hancock .... G10L 15/22
                                                             704/275
2014/0172418 A1    6/2014  Puppin
2015/0332665 A1  11/2015  Mishra et al.

OTHER PUBLICATIONS

Janarthanam et al. "Adaptive generation in dialogue systems using dynamic user modeling," Computational Linguistics, MIT Press, vol. 40, No. 4, Dec. 1, 2014, 38 pages.

Komatani et al. "Flexible Spoken Dialogue System based on User Models and Dynamic Generation of VoiceXML Scripts," SIGDIAL, Jan. 1, 2003, 10 pages.

International Search Report and Written Opinion in International Application No. PCT/US2016/069182, dated Jun. 26, 2017, 21 pages.

* cited by examiner

ADAPTIVE TEXT-TO-SPEECH OUTPUTS

CROSS-REFERENCE TO RELATED APPLICATION

This application is a continuation of U.S. patent application Ser. No. 15/477,360, filed Apr. 3, 2017, which is a continuation of U.S. patent application Ser. No. 15/009,432, filed Jan. 28, 2016, the contents of which are hereby incorporated by reference.

FIELD

This specification generally describes electronic communications.

BACKGROUND

Speech synthesis refers to the artificial production of human speech. Speech synthesizers can be implemented in software or hardware components to generate speech output corresponding to a text. For instance, a text-to-speech (TTS) system typically converts normal language text into speech by concatenating pieces of recorded speech that are stored in a database.

SUMMARY

Speech synthesis has become more central to user experience as a greater portion of electronic computing has shifted from desktop to mobile environments. For example, increases in the use of smaller mobile devices without displays have led to increases in the use of text-to-speech systems for accessing and using content that is displayed on mobile devices.

One particular issue with existing TTS systems is that such systems are often unable to adapt to varying language proficiencies of different users. This lack of flexibility often prevents users with limited language proficiencies from understanding complex text-to-speech outputs. For instance, non-native language speakers that use a TTS system can have difficulty understanding a text-to-speech output because of their limited language familiarity. Another issue with existing TTS systems is that a user's instantaneous ability to understand text-to-speech outputs can also vary based on a particular user context. For instance, some user contexts include background noise that can make it more difficult to understand longer or more complex text-to-speech outputs.

In some implementations, a system adjusts the text used for a text-to-speech output based on the language proficiency of a user to increase a likelihood that the user can comprehend the text-to-speech output. For instance, the language proficiency of a user can be inferred from prior user activity and be used to adjust the text-to-speech output to an appropriate complexity that is commensurate with the language proficiency of the user. In some examples, a system obtains multiple candidate text segments that correspond to different levels of language proficiency. The system then selects the candidate text segment that best matches and most closely corresponds to a user's language proficiency and provides a synthesized utterance of the selected text segment for output to the user. In other examples, a system alters the text in a text segment to better correspond to the user's language proficiency prior to generating a text-to-speech output. Various aspects of a text segment can be adjusted, including the vocabulary, sentence structure, length, and so on. The system then provides a synthesized utterance of the altered text segment for output to the user.

For situations in which the systems discussed here collect personal information about users, or may make use of personal information, the users may be provided with an opportunity to control whether programs or features collect personal information, e.g., information about a user's social network, social actions or activities, profession, a user's preferences, or a user's current location, or to control whether and/or how to receive content from the content server that may be more relevant to the user. In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained, such as to a city, zip code, or state level, so that a particular location of a user cannot be determined. Thus, the user may have control over how information is collected about him or her and used by a content server.

In one aspect, a computer-implemented method can include: determining, by the one or more computers, a language proficiency of a user of a client device; determining, by the one or more computers, a text segment for output by a text-to-speech module based on the determined language proficiency of the user; generating, by the one or more computers, audio data including a synthesized utterance of the text segment; and providing, by the one or more computers and to the client device, the audio data including the synthesized utterance of the text segment.

Other versions include corresponding systems, and computer programs, configured to perform the actions of the methods encoded on computer storage devices.

One or more implementations can include the following optional features. For example, in some implementations, the client device displays a mobile application that uses a text-to-speech interface.

In some implementations, determining the language proficiency of the user includes inferring a language proficiency of the user based at least on previous queries submitted by the user.

In some implementations, determining the text segment for output by the text-to-speech module includes: identifying multiple text segments as candidates for a text-to-speech output of the user, the multiple text segments having different levels of language complexity; and selecting from among the multiple text segments based at least on the determined language proficiency of the user of the client device.

In some implementations, selecting from among the multiple text segments includes: determining a language complexity score for each of the multiple text segments; and selecting the text segment having the language complexity score that best matches a reference score that describes the language proficiency of the user of the client device.

In some implementations, determining the text segment for output by the text-to-speech module includes: identifying a text segment for a text-to-speech output to the user; computing a complexity score of the text segment for the text-to-speech output; and modifying the text segment for the text-to-speech output to the user based at least on the determined language proficiency of the user and the complexity score of text segment for the text-to-speech output.

In some implementations, modifying the text segment for the text-to-speech output to the user includes: determining an overall complexity score for the user based at least on the determining language proficiency of the user; determining a complexity score for individual portions within the text segment for the text-to-speech output to the user; identifying one or more individual portions within the text segment with complexity scores greater than the overall complexity score for the user; and modifying the one or more individual portions within the text segment to reduce complexity scores below the overall complexity score.

In some implementations, modifying the text segment for the text-to-speech output to the user includes: receiving data indicating a context associated with the user; determining an overall complexity score for the context associated with the user; determining that the complexity score of the text segment exceeds the overall complexity score for the context associated with the user; and modifying the text segment to reduce the complexity score below the overall complexity score for the context associated with the user.

In another general aspect, a computer-implemented method includes: receiving data indicating a context associated with the user; determining an overall complexity score for the context associated with the user; identifying a text segment for a text-to-speech output to the user; determining that the complexity score of the text segment exceeds the overall complexity score for the context associated with the user; and modifying the text segment to reduce the complexity score below the overall complexity score for the context associated with the user.

In some implementations, determining the overall complexity score for the context associated with the user includes: identifying terms included within previously submitted queries by the user when the user was determined to be in the context; and determining an overall determining an overall complexity score for the context associated with the user based at least on the identified terms.

In some implementations, the data indicating the context associated with the user includes queries that were previously submitted by the user.

In some implementations, the data indicating the context associated with the user includes a GPS signal indicating a current location associated with the user.

The details of one or more implementations are set forth in the accompanying drawings and the description below. Other potential features and advantages will become apparent from the description, the drawings, and the claims.

Other implementations of these aspects include corresponding systems, apparatus and computer programs, configured to perform the actions of the methods, encoded on computer storage devices.

BRIEF DESCRIPTION OF THE DRAWINGS

In the drawings, like reference numbers represent corresponding parts throughout.

DETAILED DESCRIPTION

Figure 1:
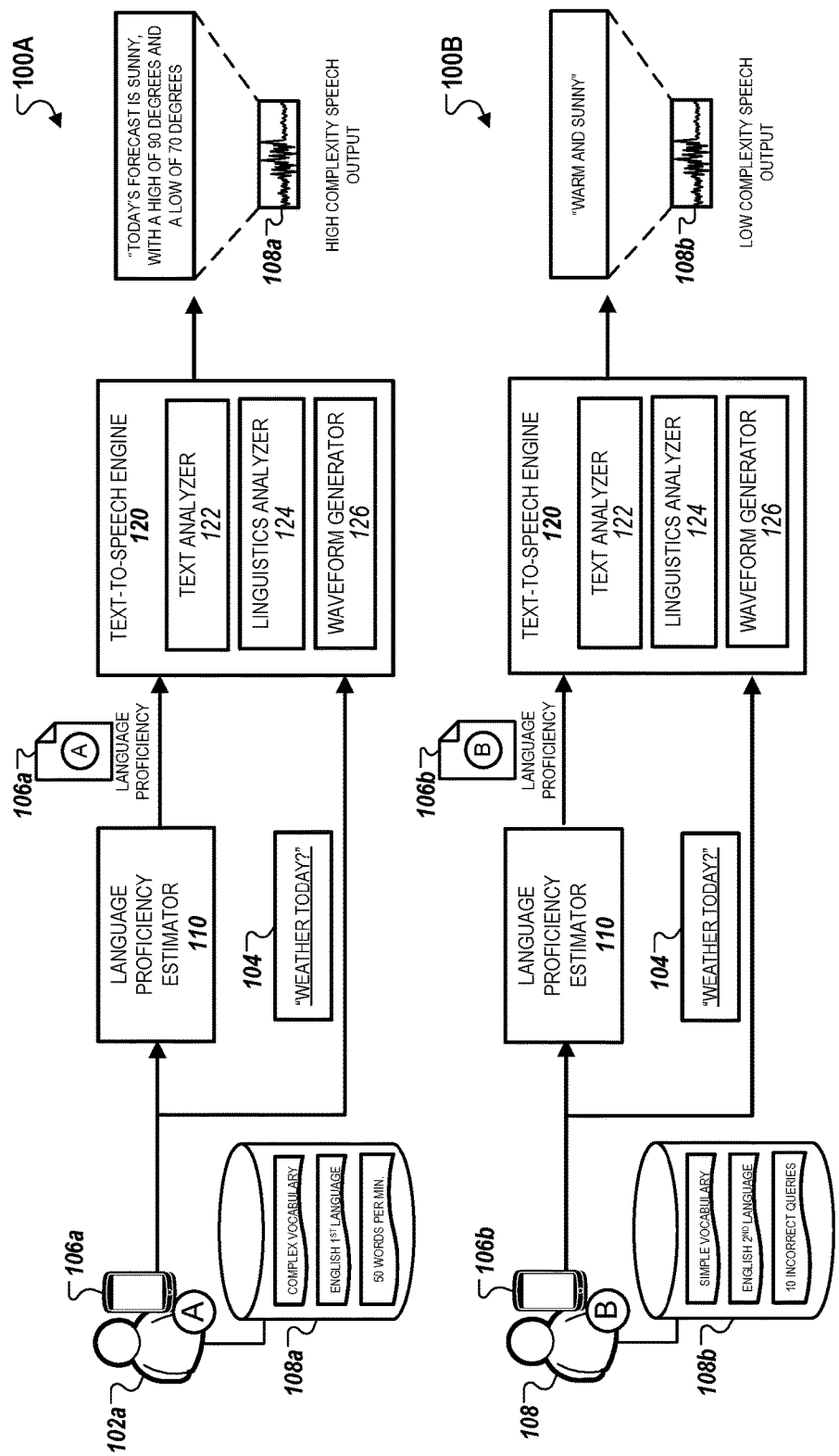
FIG. 1 is a diagram that illustrates examples of processes for generating text-to-speech outputs based on language proficiency.

FIG. 1 is a diagram that illustrates examples of processes 100A and 100B for generating text-to-speech outputs based on language proficiency. The processes 100A and 1006 are used to generate different text-to-speech outputs for a user 102a with high language proficiency and a user 102b with low language proficiency, respectively, for a text query 104. As depicted, after receiving a query 104 on the user devices 106a and 106b, the process 100A generates a high-complexity text-to-speech output 108a for the user 102a whereas the process 100B generates a low-complexity output 108b for the user 102b. In addition, the TTS systems that execute processes 100A and 1006 can include a language proficiency estimator 110, a text-to-speech engine 120. In addition, the text-to-speech engine 120 can further include a text analyzer 122, a linguistics analyzer 124, and a waveform generator 126.

In general, the content of text that is used to generate a text-to-speech output can be determined according to a language proficiency of a user. In addition, or as an alternative, the text to be used to generate a text-to-speech output can be determined based on a context of the user, for example, the location or activity of a user, background noise present, a current task of the user and so on. Further, the text to be converted to an audible form may be adjusted or determined using other information, such as indications that a user has failed to complete a task or is repeating an action.

In the example, two users, user 102a and user 102b, provide the same query 104 on user devices 106a and 106b, respectively, as input to an application, web page, or other search functionality. For instance, the query 104 can be a voice query sent to the user devices 106a and 106b to determine a weather forecast for the current day. The query 104 is then transmitted to the text-to-speech engine 120 to generate a text-to-speech output in response to the query 104.

The language proficiency estimator 110 can be a software module within a TTS system that determines a language proficiency score associated with a particular user (e.g., the user 102a or the user 102b) based on user data 108a. The language proficiency score can be an estimate of the user's ability to understand communications in a particular language, in particular, to understand speech in the particular language. One measure of language proficiency is the ability of a user to successfully complete a voice-controlled task. Many types of tasks, such as setting a calendar appointment, looking up directions, and so on, follow a sequence of interactions in which a user and device exchange verbal communication. The rate at which a user successfully completes these task workflows through a voice interface is a strong indicator of the user's language proficiency. For example, a user that completes nine out of ten voice tasks that the user initiates likely has a high language proficiency. On the other hand, a user that fails to complete the majority of voice tasks that the user initiates can be inferred to have a low language proficiency, since the user may not have fully understood the communications from the device or may not have been able to provide appropriate verbal responses. As discussed further below, when a user does not complete workflows that include standard TTS outputs, resulting in a low language proficiency score, the TTS may use adapted, simplified outputs that may increase the ability of the user to understand and complete various tasks.

As shown, the user data 108a can include words used within prior text queries submitted by the user, an indication whether English, or any other language utilized by the TTS system, is the native language of the user, and a set of activities and/or behaviors that are reflective of a user's language comprehension skills. For example, as depicted in FIG. 1, a typing speed of the user can be used to determine language fluency of the user in a language. In addition, a language vocabulary complexity score or language proficiency score can be assigned to the user based on associating a pre-determined complexity to words that were used by the user in previous text queries. In another example, the number of misrecognized words in prior queries can also be used to determine the language proficiency score. For instance, a high number of misrecognized words can be used to indicate a low language proficiency. In some implementations, the language proficiency score is determined by looking up a stored score associated with the user, which was determined for the user prior to submission of the query 104.

Figure 2:
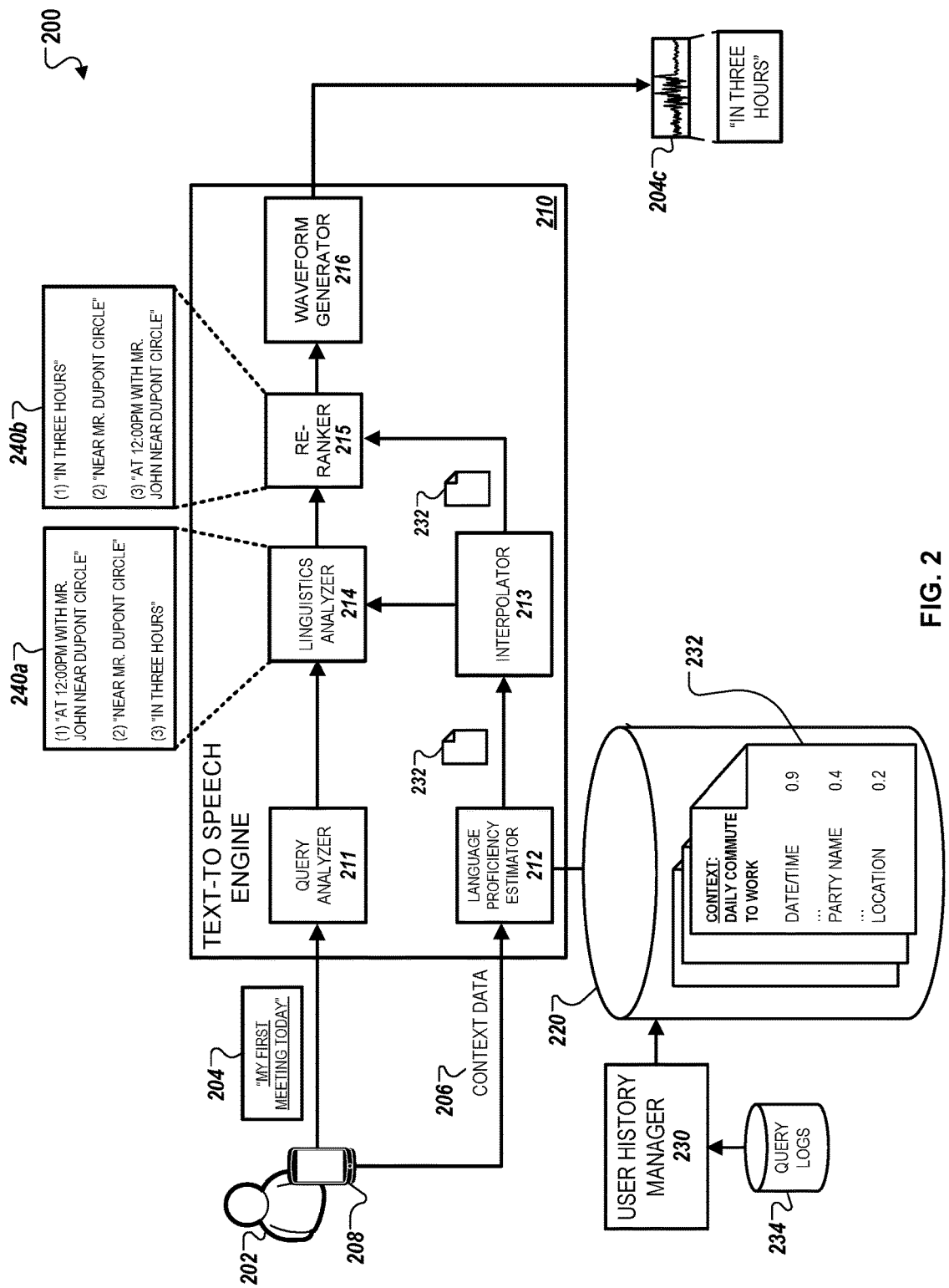
FIG. 2 is a diagram that illustrates an example of a system for generating an adaptive text-to-speech output based on a user context.

Although FIG. 1 depicts the language proficiency estimator 110 as a separate component to the TTS engine 120, in some implementations, as depicted in FIG. 2, the language proficiency estimator 110 can be an integrated software module within the TTS engine 120. In such instances, operations involving the language proficiency estimation can be directly modulated by the TTS engine 120.

In some implementations, the language proficiency score assigned to the user may be based on a particular user context estimated for the user. For instance, as described more particularly with respect to FIG. 2, a user context determination can be used to determine context-specific language proficiencies that can cause a user to temporarily have limited language comprehension abilities. For example, if the user context indicates significant background noise or if the user is engaged in a task such as driving, the language proficiency score can be used to indicate that the user's present language comprehension ability is temporarily diminished relative to other user contexts.

In some implementations, instead of inferring language proficiency based on previous user activity, the language proficiency score can instead be directly provided to the TTS engine 120 without the use of the language proficiency estimator 110. For instance, a language proficiency score can be designated to a user based on user input during a registration process that specifies a user's level of language proficiency. For example, during the registration, the user can provide a selection that specifies the user's skill level, which can then be used to calculate the appropriate language proficiency for the user. In other examples, the user can provide other types of information such as demographic information, education level, places of residences, etc., that can be used to specify the user's level of language proficiency.

In the examples described above, the language proficiency score can either be a set of discrete values that are adjusted periodically based on recently generated user activity data, or a continuous score that is initially designated during a registration process. In the first instance, the value of the language proficiency score can be biased based on one or more factors that indicate that a user's present language comprehension and proficiency may be attenuated (e.g., a user context indicating significant background noise). In the second instance, the value of the language proficiency score can be preset after an initial calculation and adjusted only after specific milestone events that indicate that a user's language proficiency has increased (e.g., an increase in typing rate or a decrease in correction rate for a given language). In other instances, a combination of these two techniques can be used to variably adjust the text-to-speech output based on a particular text input. In such instances, multiple language proficiency scores that each represent a particular aspect of the user's language skills can be used to determine to how best adjust the text-to-speech output for the user. For example, one language proficiency score can represent a complexity of the user's vocabulary whereas another language proficiency score can be used to represent the user's grammar skills.

The TTS engine 120 can use the language proficiency score to generate a text-to-speech output that is adapted to the language proficiency indicated by the user's language proficiency score. In some instances, the TTS engine 120 adapts the text-to-speech output based on selecting a particular TTS string from a set of candidate TTS strings for the text query 104. In such instances, the TTS engine 120 selects the particular TTS string based on using the language proficiency score of the user to predict a likelihood that each of the candidate TTS strings will accurately be interpreted by the user. More particular descriptions related to these techniques are provided with respect to FIG. 2. Alternatively, in other instances, the TTS engine 120 can select a baseline TTS string and adjust the structure of the TTS string based on the user's level of language proficiency indicated by the language proficiency score. In such instances, the TTS engine 120 can adjust the grammar of the baseline TTS string, provide word substitutions and/or reduce the sentence complexity to generate an adapted TTS string that is more likely to be understood by the user. More particular descriptions related to these techniques are provided with respect to FIG. 3.

Referring still to FIG. 1, the TTS engine 120 may generate different text-to-speech outputs for users 102a and 102b because the language proficiency scores for the users are different. For example, in process 100A, the language proficiency score 106a indicates high English-language proficiency, inferred from the user data 108a indicating that the user 102a has a complex vocabulary, has English as a first language, and has a relatively high word per minute in prior user queries. Based on the value of the language proficiency score 106a, the TTS engine 120 generates a high complexity text-to-speech output 108a that includes a complex grammatical structure. As depicted, the text-to-speech output 108a includes an independent clause that describes that today's forecast is sunny, in addition to a subordinate clause that includes additional information about the high temperature and the low temperature of the day.

In the example of process 100B, the language proficiency score 106b indicates low English-language proficiency, inferred from user activity data 108b indicating that the user 102b has a simple vocabulary, has English as a second language, and has previously provided ten incorrect queries. In this example, the TTS engine 120 generates a low complexity text-to-speech output 108b that includes a simpler grammatical structure relative to the text-to-speech output 108a. For instance, instead of including multiple clauses within a single sentence, the text-to-speech output 108b includes a single independent clause that conveys the same primary information as the text-to-speech output 108a (e.g., today's forecast being sunny), but does not include additional information related to the high and low temperatures for the day.

The adaptation of text for a TTS output can be performed by various different devices and software modules. For example, a TTS engine of a server system may include functionality to adjust text based on a language proficiency score and then output audio including a synthesized utterance of the adjusted text. As another example, a pre-processing module of a server system may adjust text and pass the adjusted text to a TTS engine for speech synthesis. As another example, a user device may include a TTS engine, or a TTS engine and a text pre-processor, to be able to generate appropriate TTS outputs.

In some implementations, a TTS system can include software modules that are configured to exchange communications with a third-party mobile application of a client device or a web page. For instance, the TTS functionality of the system can be made available to a third-party mobile application through an application package interface (API). The API can include defined set of protocols that an application or web site can use to request TTS audio from a server system that runs the TTS engine 120. In some implementations, the API can make available TTS functionality that runs locally on a user's device. For example, the API may be available to an application or web page through an inter-process communication (IPC), remote procedure call (RPC), or other system call or function. A TTS engine, and associated language proficiency analysis or text preprocessing, may be run locally on the user's device to determine an appropriate text for the user's language proficiency and generate the audio for the synthesized speech also.

For example, the third-party application or web page can use the API to generate a set of voice instructions that are provided to the user based on a task flow of a voice interface of the third-party application or web page. The API can specify that the application or web page should provide text to be converted to speech. In some instances, other information can be provided, such as a user identifier or a language proficiency score.

In implementations where the TTS engine 120 exchanges communications with a third-party application using an API, the TTS engine 120 can be used to determine whether a text segment from a third-party application should be adjusted prior to generating a text-to-speech output for the text. For example, the API can include computer-implemented protocols that specify conditions within the third-party application that initiate the generation of an adaptive text-to-speech output.

As an example, one API may permit an application to submit multiple different text segments as candidates for a TTS output, where the different text segments correspond to different levels of language proficiency. For example, the candidates can be text segments having equivalent meanings but different complexity levels (e.g., a high complexity response, a medium complexity response, and a low complexity response). The TTS engine 120 may then determine the level of language proficiency needed to understand each candidate, determine an appropriate language proficiency score for the user, and select the candidate text that best corresponds to the language proficiency score. The TTS engine 120 then provides synthesized audio for the selected text back to the application, e.g., over a network using the API. In some instances, the API can be locally available on the user devices 106a and 106b. In such instances, the API can be accessible over various types of inter-process communication (IPC) or via a system call. For example, the output of the API on the user devices 106a and 106b can be the text-to-speech output of the TTS engine 120 since the API operates locally on the user devices 106a and 106b.

In another example, an API can allow the third-party application to provide a single text segment and a value that indicates whether the TTS engine 120 is permitted to modify the text segment to generate a text segment with a different complexity. If the app or web page indicates that alteration is permitted, the TTS system 120 may make various changes to the text, for example, to reduce the complexity of the text when the language proficiency score suggests that the original text is more complex than the user can understand in a spoken response. In yet other examples, an API allows the third-party application to also provide user data (e.g., prior user queries submitted on the third-party application) along with the text segment such that the TTS engine 120 can determine a user context associated with the user and adjust generate a particular text-to-speech output based on the determined user context. Similarly, an API can allow an application to provide context data from a user device (e.g., a global positioning signal, accelerometer data, ambient noise level, etc.) or an indication of a user context to allow the TTS engine 120 to adjust the text-to-speech outputs that will ultimately be provided to the user through the third-party application. In some instances, the third party application can also provide the API with data that can be used to determine a language proficiency of the user.

In some implementations, the TTS engine 120 can adjust the text-to-speech output for a user query without using a language proficiency of the user or determining a context associated with the user. In such implementations, TTS engine 120 can determine that an initial text-to-speech output is too complex for a user based on receiving signals that a user has misunderstood the output (e.g., multiple retries on the same query or task). In response, the TTS engine 120 can reduce the complexity of a subsequent text-to-speech response for a retried query or related queries. Thus, when a user fails to successfully complete an action, the TTS engine 120 may progressively reduce the amount of detail or language proficiency required to understand the TTS output until it reaches a level that the user understands.

FIG. 2 is a diagram that illustrates an example of a system 200 that adaptively generates a text-to-speech output based on a user context. Briefly, the system 200 can include a TTS engine 210 that includes a query analyzer 211, a language proficiency estimator 212, an interpolator 213, a linguistics analyzer 214, a re-ranker 215, and a waveform generator 216. The system 200 also includes a context repository 220 that stores a set of context profiles 232, and a user history manager 230 that stores user history data 234. In some instances, the TTS engine 210 corresponds to the TTS engine 120 as described with respect to FIG. 1.

In the example, a user 202 initially submits a query 204 on a user device 208 that includes a request for information related to the user's first meeting for the day. The user device 208 can then transmit the query 204 and context data 206 associated with the user 202 to the query analyzer 211 and the language proficiency estimator 212, respectively. Other types of TTS outputs that are not responses to queries, e.g., calendar reminders, notifications, task workflows, etc., may be adapted using the same techniques.

The context data 206 can include information relating to a particular context associated with the user 202 such as time intervals between repeated text queries, global positioning signal (GPS) data indicating a location, speed, or movement pattern associated with the user 202, prior text queries submitted to the TTS engine 210 within a particular time period, or other types of background information that can indicate user activity related to the TTS engine 210. In some instances, the context data 206 can indicate a type of query 204 submitted to the TTS engine 210, such as whether the query 204 is a text segment associated with a user action, or an instruction transmitted to the TTS engine 210 to generate a text-to-speech output.

After receiving the query 204, the query analyzer 211 parses the query 204 to identify information that is responsive to the query 204. For example, in some instances where the query 204 is a voice query, the query analyzer 211 initially generates a transcription of the voice query, and then processes individual words or segments within the query 204 to determine information that is responsive to the query 204, for example, by providing the query to a search engine and receive search results. The transcription of the query and the identified information can then be transmitted to the linguistics analyzer 214. 204

Referring to now to the language proficiency estimator 212, after receiving the context data 206, the language proficiency estimator 212 computes a language proficiency for the user 202 based on the received context data 206 using techniques described with respect to FIG. 1. In particular, the language proficiency estimator 212 parses through various context profiles 232 stored on the repository 220. The context profile 232 can be an archived library including related types of information that are associated with a particular user context and can be included within a text-to-speech output. The context profile 232 additionally specifies a value, associated with each type of information, which represents an extent to which each type of information is likely to be understood by the user 202 when the user 202 is presently within a context associated with the context profile 232.

In the example depicted in FIG. 2, the context profile 232 specifies that the user 202 is presently in a context indicating that the user 202 is on his/her daily commute to work. In addition, the context profile 232 also specifies values for individual words and phrases that are likely to be comprehended by the user 202. For instance, data or time information is associated with a value of "0.9" for "SINCE," indicating that the user 202 is more likely to understand generalized information associated with a meeting (e.g., time of the next upcoming meeting) 204 rather than detailed information associated with a meeting (e.g., a party attending the meeting, or location of the meeting. In this example, the differences of the values indicate differences in the user's ability to understand particular types of information because the user's ability to understand complex or detailed information is diminished.

The value associated with individual words and phrases can determined based on user activity data from previous user sessions where the user 202 was previously in the context indicated by the context data 206. For instance, historical user data can be transmitted from the user history manager 230, which retrieves data stored within the query logs 234. In the example, the value for date and time information can be increased based on determining that the user commonly accesses date and time information associated with meetings more frequently than locations of the meetings.

After the language proficiency estimator 212 selects a particular context profile 232 that corresponds to the received context data 206, the language proficiency estimator 212 transmits the selected context profile 232 to the interpolator 213. The interpolator 213 parses the selected context profile 232, and extracts individual words and phrases included and their associated values. In some instances, the interpolator 213 transmits the different types of information and associated values directly to the linguistics analyzer 214 for generating a list of text-to-speech output candidates 240a. In such instances, the interpolator 213 extracts specific types of information and associated values from the selected context profile 232 and transmits them to the linguistics analyzer 214. In other instances, the interpolator 213 can also transmit the selected context profile 232 to the re-ranker 215.

In some instances, the TTS engine 210 can be provided a set of structured data (e.g., fields of a calendar event). In such instances, the interpolator 213 can convert the structured data to text at a level that matches the user's proficiency indicated by the context profile 232. For example, the TTS engine 210 may access data indicating one or more grammars indicating different levels of detail or complexity to express the information in the structured data, and select an appropriate grammar based on the user's language proficiency score. Similarly, the TTS engine 210 can use dictionaries to select words that are appropriate given the language proficiency score.

The linguistics analyzer 214 performs processing operations such as normalization on the information included within the query 204. For instance, the query analyzer 211 can assign phonetic transcriptions to each word or snippet included within the query 204, and divide the query 204 into prosodic units such as phrases, clauses, and sentences using a text-to-phenome conversion. The linguistics analyzer 214 also generates a list 240a that includes multiple text-to-speech output candidates that are identified as being responsive to the query 204. In the example, the list 240a includes multiple text-to-speech output candidates with different levels of complexity. For example, the response "At 12:00 PM with Mr. John near Dupont Circle" is the most complex response because it identifies a time for the meeting, a location for the meeting, an individual with whom the meeting will take place. In comparison, the response "In three hours" is the least complex because it only identifies a time for the meeting.

The list 240a also includes a baseline rank for the text-to-speech candidates based on the likelihood that each text-to-speech output candidate is likely to be responsive to the query 204. In the example, the list 240a indicates that most complex text-to-speech output candidate is the most likely to be responsive to the query 204 because it includes the greatest amount of information that is associated with the content of the query 204.

After the linguistics analyzer generates the list 240a of text-to-speech output candidates, the re-ranker 215 generates a list 240b, which includes an adjusted rank for the text-to-speech output candidates based on the received context data 206. For instance, the re-ranker 215 can adjust the rank based on the scores associated with particular types of information included within the selected context profile 232.

In the example, the re-ranker 215 ranks the simplest text-to-speech output as the highest based on the context profile 232 indicating that the user 202 is likely to comprehend date and time information within a text-to-speech response but not likely to understand party names or location information within the text-to-speech response given the present context of the user indicating that the user is commuting to work. In this regard, the received context data 206 can be used to adjust the selection of a particular text-to-speech output candidate that to increase the likelihood that the user 202 will understand the contents of the text-to-speech output 204c of the TTS engine 210.

Figure 3:
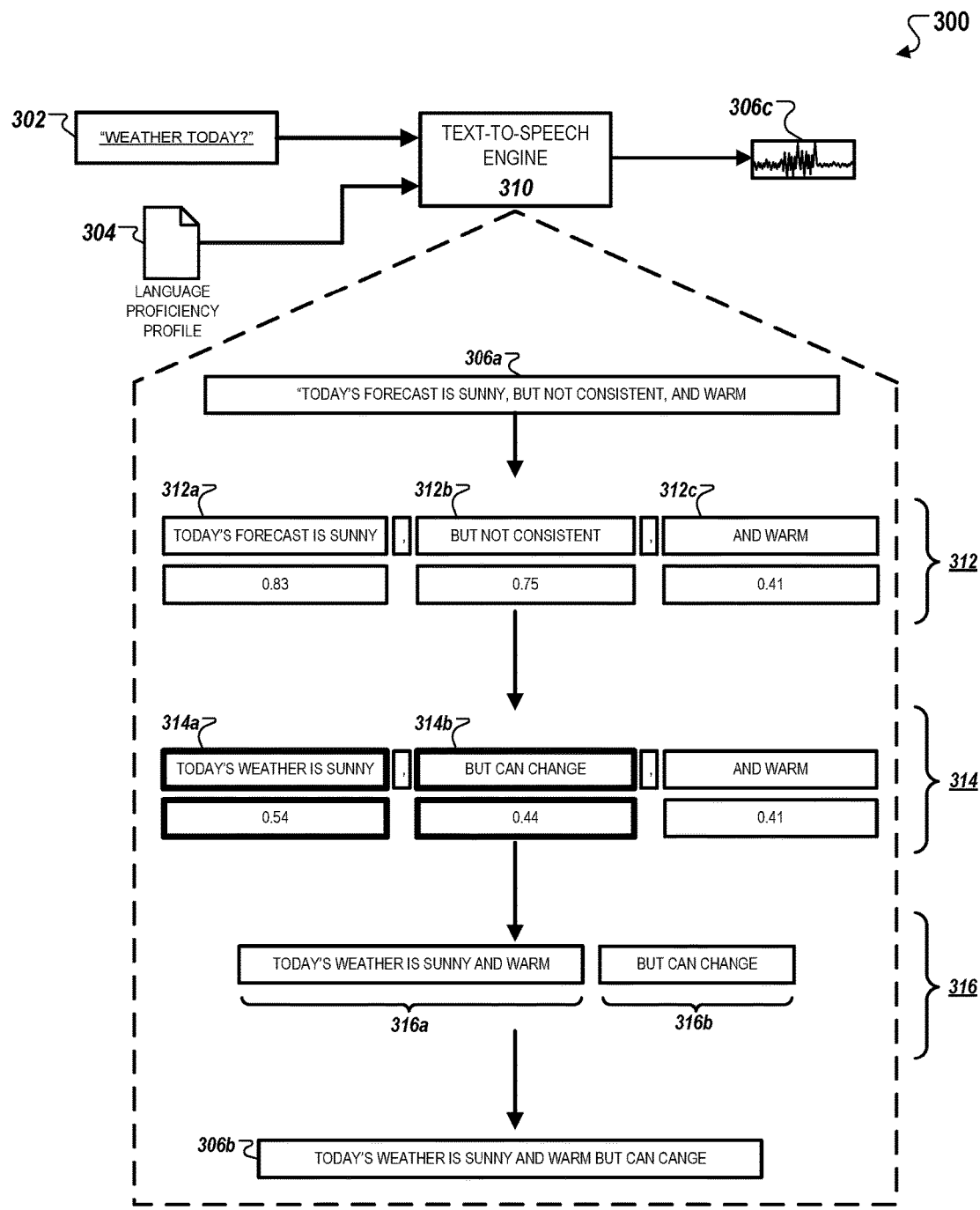
FIG. 3 is a diagram that illustrates an example of a system for modifying a sentence structure within a text-to-speech output.

FIG. 3 is a diagram that illustrates an example of a system 300 for modifying sentence structure within a text-to-speech output. Briefly, a TTS engine 310 receives a query 302 and a language proficiency profile 304 for a user (e.g., the user 202). The TTS engine 310 then perform operations 312, 314, and 316 to generate an adjusted text-to-speech output 302c that is responsive to the query 302. In some instances, the TTS engine 310 corresponds to the TTS engine 120 described with respect to FIG. 1, or the TTS engine 210 described with respect to FIG. 2.

In general, the TTS engine 310 can modify the sentence structure of a baseline text-to-speech output 306a for the query 302 using different types of adjustment techniques. As an example, the TTS engine 310 can substitute words or phrases within the baseline text-to-speech output 306a based on determining that a complexity score associated with individual words or phrases is greater than a threshold score indicated by the language complexity profile 304 of a user. As another example, the TTS engine 310 can rearrange individual sentence clauses such that the overall complexity of baseline text-to-speech output 306a is reduced to a satisfactory level based on the language complexity profile 304. The TTS engine 310 can also re-order words, split or combine sentences, and make other changes to adjust the complexity of text.

In more detail, during the operation 312, the TTS engine 310 initially generates a baseline text-to-speech output 306a that is responsive to the query 302. The TTS engine 310 then parses the baseline text-to-speech output 306a into segments 312a-312c. The TTS engine 310 also detects punctuation marks (e.g., commas, periods, semicolons, etc.) that indicate breakpoints between individual segments. The TTS engine 310 also computes a complexity score for each of the segments 312a-312c. In some instances, the complexity score can be computed based on the frequency of a particular word within a particular language. Alternative techniques can include computing the complexity score based on the frequency of use by the user, or frequency of occurrence in historical content accessed by the user (e.g., news articles, webpages, etc.). In each of these examples, the complexity score can be used to indicate words that are likely to be comprehended by the user and other words that are unlikely to be comprehended by the user.

In the example, segments 312a and 312b are determined to be relatively complex based on the inclusion of high complex terms such as "FORECAST" and "CONSISTENT," respectively. However, the segment 312c is determined to be relatively simple because the terms included are relatively simple. This determination is represented by the segments 312a and 312b having higher complexity scores (e.g., 0.83, 0.75) compared to the complexity score for the segment 312c (e.g., 0.41).

As described above, the language proficiency profile 304 can be used to compute a threshold complexity score that indicates the maximal complexity that is comprehendible by the user. In the example, the threshold complexity score can be computed to be "0.7" such that the TTS 310 determines that the segments 312a and 312b are unlikely to be comprehended by the user.

After identifying individual segments with associated complexity scores greater than the threshold complexity score indicated by the language proficiency profile 304, during the operation 314, the TTS engine 310 substitutes the identified words with alternates that are predicted to be more likely to be understood by the user. As depicted in FIG. 3, "FORECAST" can be substituted with "WEATHER," and "CONSISTENT" can be substituted with "CHANGE." In these examples, segments 314an and 314b represent simpler alternatives with lower complexity scores below the threshold complexity score indicated by the language proficiency profile 304.

In some implementations, TTS engine 310 can process word substitutions for high complexity words using a trained skip-gram model that uses unsupervised techniques to determine appropriately complex words to replace highly complex words. In some instances, the TTS engine 310 can also use thesaurus or synonym data to process word substitutions for high complex words.

Referring now to operation 316, sentence clauses of a query can be adjusted based on computing complexities associated with particular sentence structures and determining whether is the user will be able to understand the sentence structure based on a language proficiency indicated by the language proficiency profile 304.

In the example, the TTS engine 310 determines that the baseline text-to-speech response 306a has a high sentence complexity based on determining that the baseline text-to-speech response 306a includes three sentence clauses (e.g., "today's forecast is sunny," "but not consistent," and "and warm"). In response, the TTS engine 310 can generate adjusted sentence portions 316a and 316b, which combine a dependent clause and an independent clause into a single clause that does not include a segmenting punctuation mark. As a result, the adjusted text-to-speech response 306b includes both simpler vocabulary (e.g., "WEATHER," "CHANGE") as well as a simpler sentence structure (e.g., no clause separations), increasing the likelihood that the user will understand the adjusted text-to-speech output 306b. The adjusted text-to-speech output 306b is then generated for output by the TTS engine 310 as the output 306c.

In some implementations, the TTS engine 310 can perform sentence structure adjustment based on using a user-specific restructuring algorithm that include adjusts the baseline query 302a using weighting factors to avoid particular sentence structures that are identified to be problematic for the user. For example, the user-specific restructuring algorithm can specify an option to down-weights the inclusion of subordinate clauses or up-weights sentence clauses that have simple subject verb object sequences.

Figure 4:
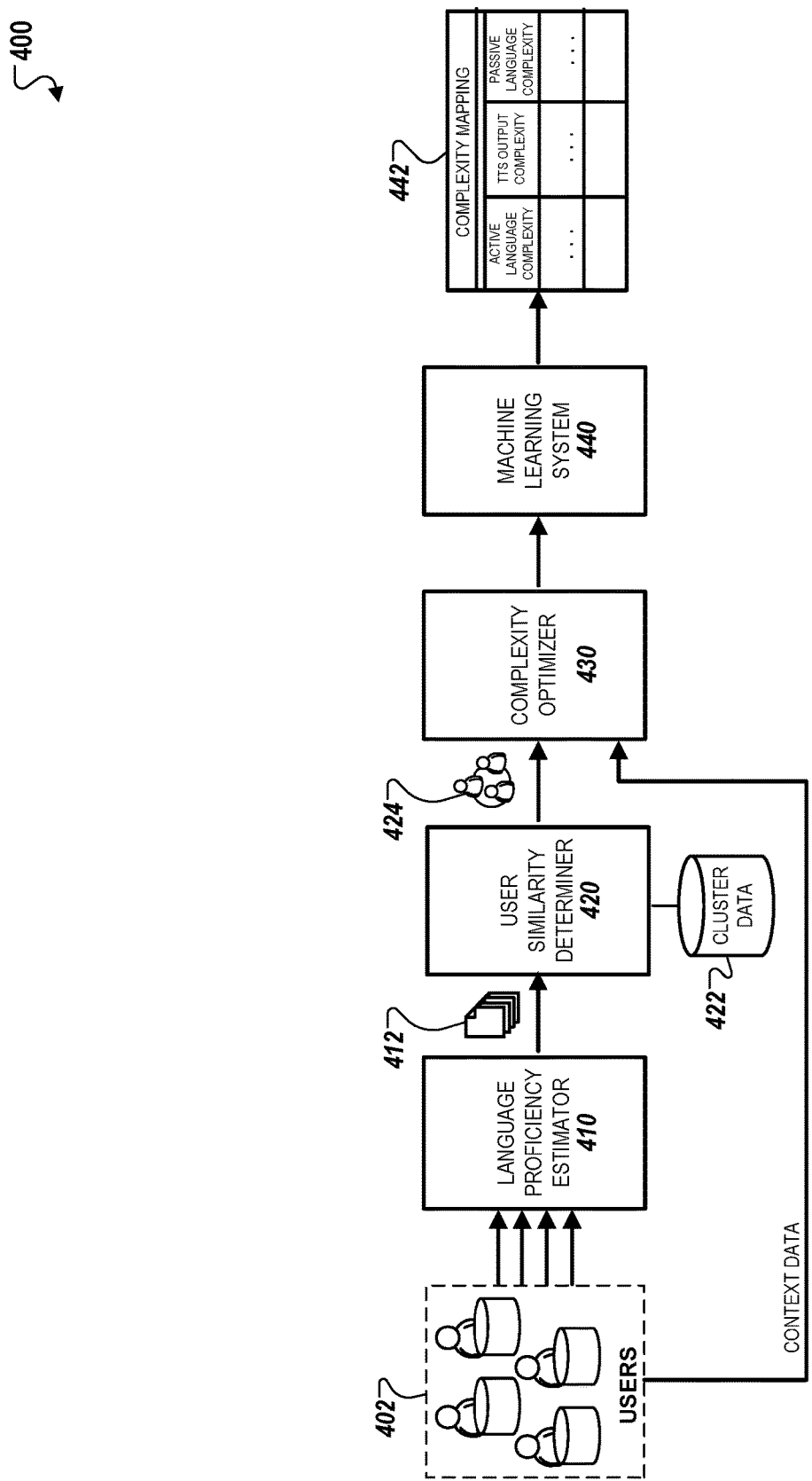
FIG. 4 is a block diagram that illustrates an example of a system for generating adaptive text-to-speech outputs based on using clustering techniques.

FIG. 4 is a block diagram that illustrates an example of a system 400 that adaptively generates text-to-speech outputs based on using clustering techniques. The system 400 includes a language proficiency estimator 410, a user similarity determiner 420, a complexity optimizer, and a machine learning system 400.

Briefly, the language proficiency estimator 410 receives data from a plurality of users 402. The language proficiency estimator 410 then estimates a set of language complexity profiles 412 for each of the plurality of users 402, which is then sent to the user similarity determiner 420. The user similarity determiner 420 identifies user clusters 424 of similar users. The complexity optimizer 430 and the machine learning system 440 then analyzes the language complexity profiles 412 of each user within the user clusters 424 and the context data received from the plurality of users 402 in order to generate a complexity mapping 442.

In general, the system 400 can be used to analyze relationships between active language complexity and passive language complexity for a population of users. Active language complexity refers to detected language input provided by the user (e.g., text queries, voice input, etc.). Passive language complexity refers to a user's ability to understand or comprehend speech signals that are provided to the user. In this regard, the system 400 can use the determined relationship between the active language complexity and the passive language complexity for multiple users to determine an appropriate passive language complexity for each individual user where the particular user has the highest likelihood of understanding a text-to-speech output.

The plurality of users 402 can be multiple users that use an application associated with a TTS engine (e.g., the TTS engine 120). For instance, the plurality of users 402 can be a set of users that use a mobile application that utilizes a TTS engine to provide users with text-to-speech features over a user interface of the mobile application. In such an instance, data from the plurality of users 402 (e.g., prior user queries, user selections, etc.) can be tracked by the mobile application and aggregated for analysis by the language proficiency estimator 410.

The language proficiency estimator 410 can initially measure passive language complexities for the plurality of users 402 using substantially similar techniques as those described previously with respect to FIG. 1. The language proficiency estimator 410 can then generate the language complexity profiles 412, which includes an individual language complexity profile for each of the plurality of users 402. Each individual language complexity profile includes data indicating the passive language complexity and the active language complexity for each of the plurality of users 402.

The user similarity determiner 420 uses the language complexity data included within the set of language proficiency profiles 412 to identify similar users within the plurality of users 402. In some instances, the user similarity determiner 420 can group users that have similar active language complexities (e.g., similar language inputs, speech queries provided, etc.). In other instances, the user similarity determiner 420 can determine similar users by comparing words included in prior user-submitted queries, particular user behaviors on a mobile application, or user locations. The user similarity determiner 420 then clusters the similar users to generate the user clusters 424.

In some implementations, the user similarity determiner 420 generates the user clusters 424 based stored on cluster data 422 that include aggregate data for users in specified clusters. For example, the cluster data 422 can be grouped by specific parameters (e.g. number of incorrect query responses, etc.) that indicate a passive language complexity associated with the plurality of users 402.

After generating the user clusters 424, the complexity optimizer 430 varies the complexity of the language output by a TTS system and measures a user's passive language complexity using a set of parameters that indicate a user's ability to understand language output by the TTS system (e.g., understanding rate, voice action flow completion rate, or answer success rate) to indicate user performance. For instance, the parameters can be used to characterize how well users within each cluster 424 understand a given text-to-speech output. In such instances, the complexity optimizer 430 can initially provide a low complexity speech signal to the user and recursively provide additional speech signals within a range of complexities.

In some implementations, the complexity optimizer 430 can also determine the optimal passive language complexity for various user contexts associated with each user cluster 424. For instance, after measuring the user's language proficiency using the set of parameters, the complexity optimizer 430 can then classify the measured data by context data received from the plurality of users 402 such that an optimal passive language complexity can be determined for each user context.

After gathering performance data for the range of passive language complexities, the machine learning system 440 then determines a particular passive language complexity where the performance parameters indicate that the user's language comprehension is the strongest. For instance, the machine learning system 440 aggregates the performance data all users within a particular user cluster 424 to determine relationships between the active language complexity, the passive language complexity, and the user context.

The aggregate data for the user cluster 424 can then compared to individual data for each user within the user cluster 424 to determine an actual language complexity score for each user within the user cluster 424. For instance, as depicted in FIG. 4, the complexity mapping 442 can represent the relationship between active language complexity and passive language complexity to infer the actual language complexity, which corresponds to the active language complexity mapped to the optimal passive language complexity.

The complexity mapping 442 represents relationships between active language complexity, TTS complexity, and passive language complexity for all user clusters within the plurality of user 402, which can then be used to predict the appropriate TTS complexity for a subsequent query by an individual user. For example, as described above, user inputs (e.g., queries, text messages, e-mails, etc.) can be used to group similar users into user clusters 424. For each cluster, the system provides TTS outputs requiring varying levels of language proficiency to understand. The system then assesses the responses received from users, and the rate of task completion for the varied TTS outputs, to determine a level of language complexity that is appropriate for the users in each cluster. The system stores a mapping 442 between cluster identifiers and TTS complexity scores corresponding to the identified clusters. The system then uses the complexity mapping 442 to determine an appropriate level of complexity for a TTS output for a user. For example, the system identifies a cluster that represents a user's active language proficiency, looks up a corresponding TTS complexity score (e.g., indicating a level of passive language understanding) for the cluster in the mapping 442, and generates a TTS output having a complexity level indicated by the retrieved TTS complexity score.

The actual language complexity determined for a user can then be used to adjust the TTS system using techniques described with respect to FIGS. 1-3. In this regard, aggregate language complexity data from a group of similar users (e.g., the user cluster 424) can be used to intelligently adjust the performance of a TTS system with respect to a single user.

Figure 5:
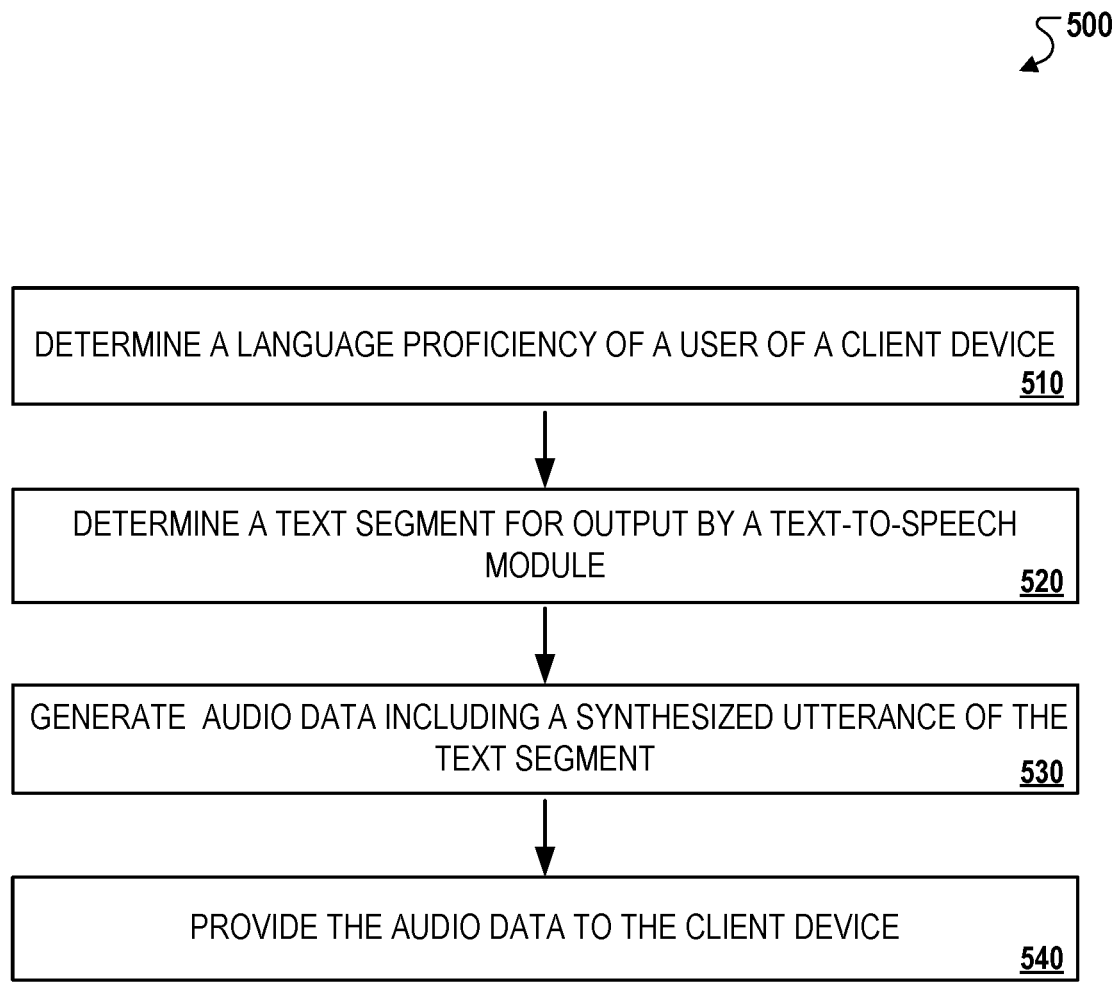
FIG. 5 is a flow diagram that illustrates an example of a process for generating adaptive text-to-speech outputs.

FIG. 5 is a flow diagram that illustrates an example of a process 500 for adaptively generating text-to-speech output. Briefly, the process 500 can include determining a language proficiency of a user of a client device (510), determining a text segment for output by a text-to-speech module (520), generating audio data including a synthesized utterance of the text segment (530), and providing the audio data to the client device (540).

In more detail, the process 500 can include determining a language proficiency of a user of a client device (510). For instance, as described with respect to FIG. 1, the language proficiency estimator 110 can determine a language proficiency for a user using a variety of techniques. In some instances, the language proficiency can represent an assigned score that indicates a level of language proficiency. In other instances, the language proficiency can represent an assigned category from a plurality of categories of language proficiency. In other instances, the language proficiency can be determined based on user input and/or behaviors indicating a proficiency level of the user.

In some implementations, the language proficiency can be inferred from different user signals. For instance, as described with respect to FIG. 1, language proficiency can be inferred from vocabulary complexity of user inputs, data entry rate of the user, a number of misrecognized words from a speech input, a number of completed voice actions for different levels of TTS complexity, or a level of complexity of texts viewed by the user (e.g., books, articles, text on webpages, etc.).

The process 500 can include determining a text segment for output by a text-to-speech module (520). For instance, a TTS engine can adjust a baseline text segment based on the determine language proficiency of the user. In some instances, as described with respect to FIG. 2, the text segment for output can be adjusted based on a user context associated the with user. In other instances, as described with respect to FIG. 3, the text segment for output can also be adjusted by word substitution or sentence restructuring in order to reduce the complexity of the text segment. For example, the adjustment can be based on how rare individual words included in the text segments, the type of verbs used (e.g., compound verbs, or verb tense), the linguistic structure of the text segment (e.g., number of subordinate clauses, amount of separation between related words, degree the that phrases are nested, etc. In other examples, the adjustment can also be based on linguistic measures above with reference measurements for linguistic characteristics (e.g., average separation between subjects and verbs, separation between adjectives and nouns, etc.). In such examples, reference measurements can represent averages, or could include ranges or examples for different complexity levels.

In some implementations, determining the text segment for output can include selecting text segments that have scores that best match reference scores that describe a language proficiency level of the user. In other implementations, individual words or phrases can be scored for complexity, and then the most complex words can be substituted, deleted, or restructured such that overall complexity meets an appropriate level for the user.

The process 500 can include generating audio data including a synthesized utterance of the text segment (530).

The process 500 can include providing the audio data to the client device (540).

Figure 6:
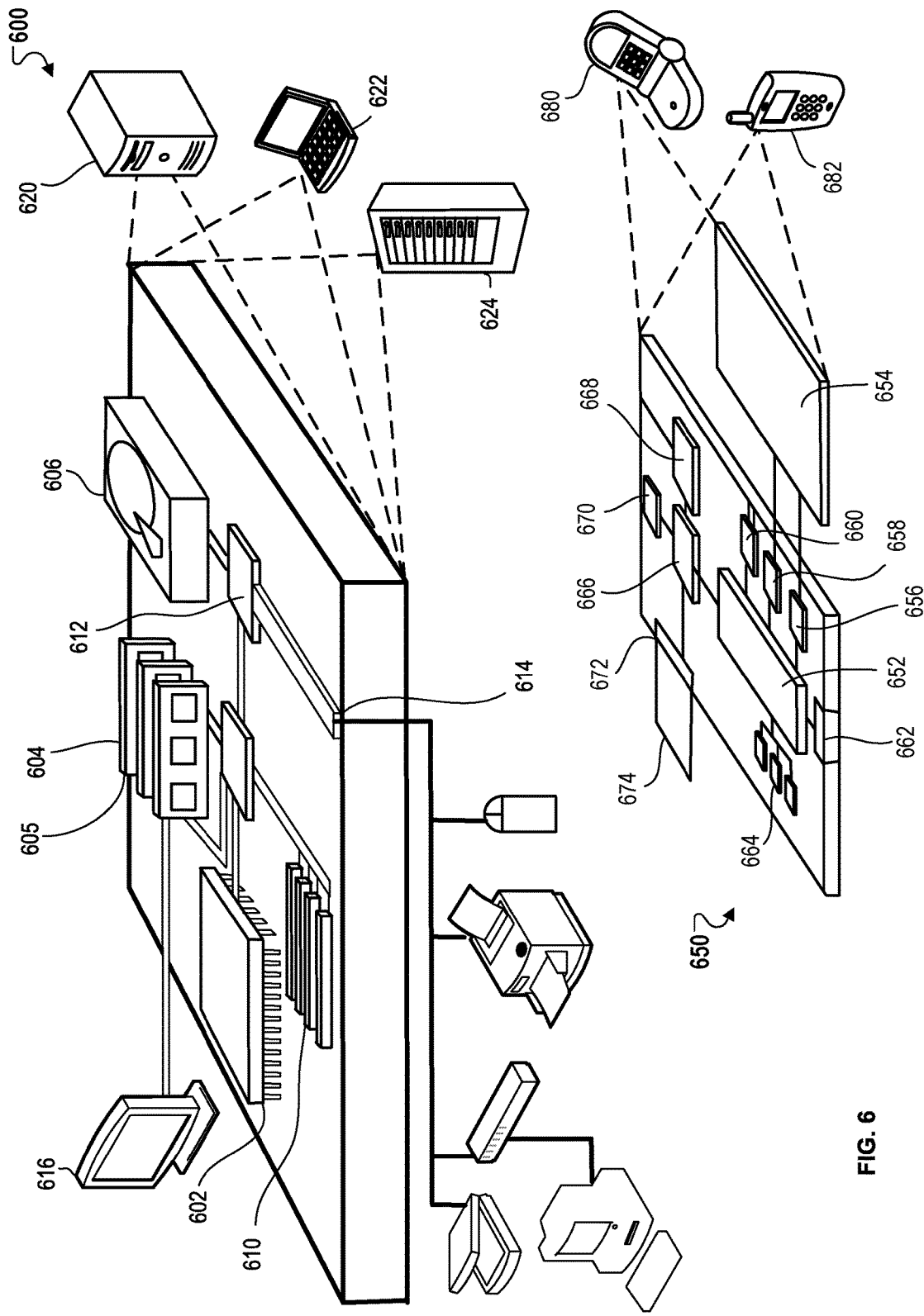
FIG. 6 is a block diagram of computing devices on which the processes described herein, or portions thereof, can be implemented.

FIG. 6 is a block diagram of computing devices 600, 650 that can be used to implement the systems and methods described in this document, as either a client or as a server or plurality of servers. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. Additionally, computing device 600 or 650 can include Universal Serial Bus (USB) flash drives. The USB flash drives can store operating systems and other applications. The USB flash drives can include input/output components, such as a wireless transmitter or USB connector that can be inserted into a USB port of another computing device. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and can be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses can be used, as appropriate, along with multiple memories and types of memory. Also, multiple computing devices 600 can be connected, with each device providing portions of the necessary operations, e.g., as a server bank, a group of blade servers, or a multi-processor system.

The memory 604 stores information within the computing device 600. In one implementation, the memory 604 is a volatile memory unit or units. In another implementation, the memory 604 is a non-volatile memory unit or units. The memory 604 can also be another form of computer-readable medium, such as a magnetic or optical disk.

The storage device 606 is capable of providing mass storage for the computing device 600. In one implementation, the storage device 606 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product can also contain instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 600, while the low speed controller 612 manages lower bandwidth intensive operations. Such allocation of functions is exemplary only. In one implementation, the high-speed controller 608 is coupled to memory 604, display 616, e.g., through a graphics processor or accelerator, and to high-speed expansion ports 610, which can accept various expansion cards (not shown). In the implementation, low-speed controller 612 is coupled to storage device 606 and low-speed expansion port 614. The low-speed expansion port, which can include various communication ports, e.g., USB, Bluetooth, Ethernet, wireless Ethernet can be coupled to one or more input/output devices, such as a keyboard, a pointing device, microphone/speaker pair, a scanner, or a networking device such as a switch or router, e.g., through a network adapter. The computing device 600 can be implemented in a number of different forms, as shown in the figure. For example, it can be implemented as a standard server 620, or multiple times in a group of such servers. It can also be implemented as part of a rack server system 624. In addition, it can be implemented in a personal computer such as a laptop computer 622. Alternatively, components from computing device 600 can be combined with other components in a mobile device (not shown), such as device 650. Each of such devices can contain one or more of computing device 600, 650, and an entire system can be made up of multiple computing devices 600, 650 communicating with each other.

The computing device 600 can be implemented in a number of different forms, as shown in the figure. For example, it can be implemented as a standard server 620, or multiple times in a group of such servers. It can also be implemented as part of a rack server system 624. In addition, it can be implemented in a personal computer such as a laptop computer 622. Alternatively, components from computing device 600 can be combined with other components in a mobile device (not shown), such as device 650. Each of such devices can contain one or more of computing device 600, 650, and an entire system can be made up of multiple computing devices 600, 650 communicating with each other.

Computing device 650 includes a processor 652, memory 664, and an input/output device such as a display 654, a communication interface 666, and a transceiver 668, among other components. The device 650 can also be provided with a storage device, such as a microdrive or other device, to provide additional storage. Each of the components 650, 652, 664, 654, 666, and 668, are interconnected using various buses, and several of the components can be mounted on a common motherboard or in other manners as appropriate.

The processor 652 can execute instructions within the computing device 650, including instructions stored in the memory 664. The processor can be implemented as a chipset of chips that include separate and multiple analog and digital processors. Additionally, the processor can be implemented using any of a number of architectures. For example, the processor 610 can be a CISC (Complex Instruction Set Computers) processor, a RISC (Reduced Instruction Set Computer) processor, or a MISC (Minimal Instruction Set Computer) processor. The processor can provide, for example, for coordination of the other components of the device 650, such as control of user interfaces, applications run by device 650, and wireless communication by device 650.

Processor 652 can communicate with a user through control interface 658 and display interface 656 coupled to a display 654. The display 654 can be, for example, a TFT (Thin-Film-Transistor Liquid Crystal Display) display or an OLED (Organic Light Emitting Diode) display, or other appropriate display technology. The display interface 656 can include appropriate circuitry for driving the display 654 to present graphical and other information to a user. The control interface 658 can receive commands from a user and convert them for submission to the processor 652. In addition, an external interface 662 can be provide in communication with processor 652, so as to enable near area communication of device 650 with other devices. External interface 662 can provide, for example, for wired communication in some implementations, or for wireless communication in other implementations, and multiple interfaces can also be used.

The memory 664 stores information within the computing device 650. The memory 664 can be implemented as one or more of a computer-readable medium or media, a volatile memory unit or units, or a non-volatile memory unit or units. Expansion memory 674 can also be provided and connected to device 650 through expansion interface 672, which can include, for example, a SIMM (Single In Line Memory Module) card interface. Such expansion memory 674 can provide extra storage space for device 650, or can also store applications or other information for device 650. Specifically, expansion memory 674 can include instructions to carry out or supplement the processes described above, and can include secure information also. Thus, for example, expansion memory 674 can be provide as a security module for device 650, and can be programmed with instructions that permit secure use of device 650. In addition, secure applications can be provided via the SIMM cards, along with additional information, such as placing identifying information on the SIMM card in a non-hackable manner.

The memory can include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652 that can be received, for example, over transceiver 668 or external interface 662.

Device 650 can communicate wirelessly through communication interface 666, which can include digital signal processing circuitry where necessary. Communication interface 666 can provide for communications under various modes or protocols, such as GSM voice calls, SMS, EMS, or MMS messaging, CDMA, TDMA, PDC, WCDMA, CDMA2000, or GPRS, among others. Such communication can occur, for example, through radio-frequency transceiver 668. In addition, short-range communication can occur, such as using a Bluetooth, Wi-Fi, or other such transceiver (not shown). In addition, GPS (Global Positioning System) receiver module 670 can provide additional navigation- and location-related wireless data to device 650, which can be used as appropriate by applications running on device 650.

Device 650 can also communicate audibly using audio codec 660, which can receive spoken information from a user and convert it to usable digital information. Audio codec 660 can likewise generate audible sound for a user, such as through a speaker, e.g., in a handset of device 650. Such sound can include sound from voice telephone calls, can include recorded sound, e.g., voice messages, music files, etc. and can also include sound generated by applications operating on device 650.

The computing device 650 can be implemented in a number of different forms, as shown in the figure. For example, it can be implemented as a cellular telephone 480. It can also be implemented as part of a smartphone 682, personal digital assistant, or other similar mobile device.

Various implementations of the systems and methods described here can be realized in digital electronic circuitry, integrated circuitry, specially designed ASICs (application specific integrated circuits), computer hardware, firmware, software, and/or combinations of such implementations. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device, e.g., magnetic discs, optical disks, memory, Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device, e.g., a CRT (cathode ray tube) or LCD (liquid crystal display) monitor for displaying information to the user and a keyboard and a pointing device, e.g., a mouse or a trackball by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The systems and techniques described here can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the systems and techniques described here, or any combination of such back end, middleware, or front end components. The components of the system can be interconnected by any form or medium of digital data communication, e.g., a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications can be made without departing from the spirit and scope of the invention. In addition, the logic flows depicted in the figures do not require the particular order shown, or sequential order, to achieve desirable results. In addition, other steps can be provided, or steps can be eliminated, from the described flows, and other components can be added to, or removed from, the described systems. Accordingly, other embodiments are within the scope of the following claims.

What is claimed is:

1. A method performed by one or more computers, the method comprising:
   receiving, by the one or more computers, context data from a client device of a user;
   selecting, by the one or more computers, a user context corresponding to the context data from the client device, the user context being selected from among a plurality of user contexts, and the user context indicating a level of complexity of speech that the user is likely able to comprehend at a given time when the context data was received;
   selecting, by the one or more computers and from among a plurality of candidate text segments that correspond to different levels of complexity of speech, the text segment for text-to-speech synthesis by a text-to-speech module that best matches the selected user context;
   generating, by the one or more computers, audio data comprising a synthesized utterance of the selected text segment using the text-to-speech module; and
   providing, by the one or more computers and to the client device, the audio data comprising the synthesized utterance of the selected text segment.

2. The method of claim 1, further comprising:
   receiving, by the one or more computers, data indicating a voice query detected by the client device; and
   generating, by the one or more computers, the plurality of candidate text segments, each candidate text segment responsive to the voice query,
   wherein receiving the context data comprises receiving context data indicating a current context when the voice query was detected by the client device, and
   wherein providing the audio data comprises providing the audio data to the client device for output as a response to the voice query.

3. The method of claim 1, further comprising generating each of the plurality of candidate text segments from one or more search results identified by a search engine in response to a query from the user.

4. The method of claim 1, wherein receiving the context data comprises receiving data indicating a location, speed, or movement pattern of the client device; and
   wherein selecting the user context comprises selecting the user context based on the location, speed, or movement pattern of the client device indicated by the context data.

5. The method of claim 1, wherein the context data indicates a GPS data indicating a current location associated with the user; and
   wherein selecting the user context comprises selecting the user context based on the GPS data indicating the current location associated with the user.

6. The method of claim 1, wherein the context data includes sensor data from a mobile device of the user; and
   wherein selecting the user context comprises selecting the user context based on the sensor data from the mobile device of the user.

7. The method of claim 1, further comprising:
   generating, by the one or more computers, the plurality of candidate text segments in response to a query from the user;
   ranking, by the one or more computers, the plurality of candidate text segments based on a likelihood that each candidate text segment is likely to be responsive to the query; and
   re-ranking, by the one or more computers, the plurality of candidate text segments based on the selected user context.

8. The method of claim 7, wherein the selected text segment that best matches the selected user context corresponds to the candidate text segment having the highest rank after the re-ranking.

9. The method of claim 1, wherein the client device displays a mobile application that uses a text-to-speech interface.

10. The method of claim 1, wherein the user context is selected based on one or more queries that were previously submitted by the user, data indicating a current task of the user, or an indication that the user failed to complete a task.

11. A system comprising:
    one or more computers; and
    a non-transitory computer-readable medium coupled to the one or more computers having instructions stored thereon, which, when executed by the one or more computers, cause the one or more computers to perform operations comprising:
    receiving context data from a client device of a user;

selecting a user context corresponding to the context data from the client device, the user context being selected from among a plurality of user contexts, and the user context indicating a level of complexity of speech that the user is likely able to comprehend at a given time when the context data was received;

selecting, from among a plurality of candidate text segments that correspond to different levels of complexity of speech, the text segment for text-to-speech synthesis by a text-to-speech module that best matches the selected user context;

generating audio data comprising a synthesized utterance of the selected text segment using the text-to-speech module; and providing, to the client device, the audio data comprising the synthesized utterance of the selected text segment.

12. The system of claim 11, wherein the operations further comprise:

receiving data indicating a voice query detected by the client device; and generating the plurality of candidate text segments, each candidate text segment responsive to the voice query, wherein receiving the context data comprises receiving context data indicating a current context when the voice query was detected by the client device, and wherein providing the audio data comprises providing the audio data to the client device for output as a response to the voice query.

13. The system of claim 11, wherein the operations further comprise generating each of the plurality of candidate text segments from one or more search results identified by a search engine in response to a query from the user.

14. The system of claim 11, wherein:

receiving the context data comprises receiving data indicating a location, speed, or movement pattern of the client device; and selecting the user context comprises selecting the user context based on the location, speed, or movement pattern of the client device indicated by the context data.

15. A non-transitory computer-readable storage device encoded with computer program instructions that, when executed by one or more computers, cause the one or more computers to perform operations comprising:

receiving context data from a client device of a user;

selecting a user context corresponding to the context data from the client device, the user context being selected from among a plurality of user contexts, and the user context indicating a level of complexity of speech that the user is likely able to comprehend at a given time when the context data was received;

selecting from among a plurality of candidate text segments that correspond to different levels of complexity of speech, the text segment for text-to-speech synthesis by a text-to-speech module that best matches the selected user context;

generating, by the one or more computers, audio data comprising a synthesized utterance of the selected text segment using the text-to-speech module; and providing, to the client device, the audio data comprising the synthesized utterance of the selected text segment.

16. The non-transitory computer-readable storage device of claim 15, wherein the operations further comprise:

receiving data indicating a voice query detected by the client device; and generating the plurality of candidate text segments, each candidate text segment responsive to the voice query, wherein receiving the context data comprises receiving context data indicating a current context when the voice query was detected by the client device, and wherein providing the audio data comprises providing the audio data to the client device for output as a response to the voice query.

17. The non-transitory computer-readable storage device of claim 15, wherein the operations further comprise generating each of the plurality of candidate text segments from one or more search results identified by a search engine in response to a query from the user.

18. The non-transitory computer-readable storage device of claim 15, wherein:

receiving the context data comprises receiving data indicating a location, speed, or movement pattern of the client device; and selecting the user context comprises selecting the user context based on the location, speed, or movement pattern of the client device indicated by the context data.

19. The non-transitory computer-readable storage device of claim 15, wherein the user context is selected based on one or more queries that were previously submitted by the user, data indicating a current task of the user, or an indication that the user failed to complete a task.

* * * * *